Patented July 8, 1930

1,770,166

UNITED STATES PATENT OFFICE

FRANKLIN A. BENT, OF BERKELEY, CALIFORNIA, ASSIGNOR, BY MESNE ASSIGNMENTS, TO CONTACT FILTRATION COMPANY, OF SAN FRANCISCO, CALIFORNIA, A CORPORATION OF DELAWARE

METHOD OF TREATING ADSORBENTS

No Drawing. Application filed March 10, 1928. Serial No. 260,819.

This invention relates to the treatment of adsorbents or finely divided adsorptive material, such as clarifying and decolorizing agents. The invention particularly relates to the revivification of clarifying and decolorizing agents which have been used in the treatment of hydrocarbon oils. The method comprising this invention is especially adapted for the revivification of finely divided solid adsorbents, such as the various forms of clays used and spent in contact filtration of petroleum oils.

In the treatment of various hydrocarbon oils it is common practice to use filtering agents in finely divided or granular form. A large number of materials may be used for clarification and decolorization, among which are various forms of clays (having a natural adsorptive action or an adsorptive action generated by a preliminary activating treatment), decolorizing carbons, various gels, such as silica gels, and other materials. These adsorbents may be in granular form, such as, for example, fuller's earth, which may be of about 30 to 60 mesh so as to allow the oil to be purified to percolate through a body of such granular material. Other adsorbents may be in pulverized form; for example, acid treated Death Valley clay as used in contact filtration of various oils may be ground to approximately 200 mesh to afford greater surface contact with the oil being treated. Pulverized adsorbents are generally mixed with the oil, agitated in the presence of heat so as to hasten the reaction, and then removed from the clarified and decolorized oil in a suitable manner, for example, by means of a filter press.

Both granular and finely divided or pulverized adsorbing materials remove coloring matter and other impurities from the oil being treated, and such materials, after being removed from the oil on which their action has been exerted, retain not only the coloring matter and other impurities but also a considerable portion of the oil itself which is entrained in the pores of or clings to the surfaces of the individual particles of the solid material.

After adsorbent materials have been used in the treatment of oils, it is necessary to remove the adsorbed impurities as well as the oil entrained in the material before the adsorbent may be economically reused. This invention relates to an improved process of treating spent decolorizing or filtering materials having an adsorptive action to render them suitable for further use.

An object of this invention is to provide a method of treating spent clarifying and decolorizing agents with solvents to restore the active adsorbing power of the material. Another object is to provide a method of treating clarifying and decolorizing agents after use in the treatment of hydrocarbon oils with a solvent capable of efficiently dissolving both oil and adsorbed impurities in a single operation. Another object is to provide a simple and efficient method of reclaiming the oil ordinarily retained in the pores of an adsorbent after it is removed from the oil treated thereby. Another object is to utilize a solvent for the revivification of clarifying and decolorizing agents used in the treatment of hydrocarbon oil, which is capable of efficiently dissolving both oil and adsorbed impurities and which may be readily separated from such oil and impurities. Another object is to disclose a method of revivifying adsorbents after their use in the treatment of hydrocarbon oils with a diatomic alcohol. Another object is to disclose a method of utilizing glycol derivatives in the revivification of adsorbents used in the treatment of hydrocarbon oils.

Although it has been recognized heretofore that spent clarifying and decolorizing materials having certain adsorptive powers contain coloring matter of impurities extracted from the oil on which these materials have been used as well as a quantity of the oil itself, none of the prior processes known heretofore have been capable of extracting or removing both the coloring matter and the oil in a single operation. Oil adhering to particles of granulated or pulverized material may be effectively removed by extraction with a suitable solvent, such as gasoline, and the solvent subsequently recovered by distillation. An oil solvent of this character, however, does not remove the impurities or coloring matter held in the pores of the material and hence cannot restore the adsorbent material to its original active conditions.

In the case of granular filtering and clarifying agents, it is customary to wash out the entrained oil by means of gasoline or other light distillates, the solvent being removed from the material by steaming. Attempts have been made heretofore to remove the remaining impurities by heating the residue under oxidizing conditions so as to burn out the coloring matter and impurities. By thus destructively distilling and oxidizing the entrained foreign matter the properties of the material as a percolating agent are largely restored but a certain amount of coking and glazing or partial fusion takes place which tends to reduce the active power of the material so that it must finally be discarded.

While the above method of revivification by burning may be practicable for granular materials, it is ineffective for revivifying finely divided or pulverized adsorbents, clays and the like which are used in the treatment of hydrocarbon oils, for example by the contact filtration method. These finely divided or pulverized materials glaze quite rapidly so that their surface structure and porosity is impaired and their active adsorbing and decolorizing powers are very quickly and materially reduced. In the treatment of finely divided adsorbent for reuse, it has been necessary to first remove the entrained or adsorbed oil by means of one solvent and then attempt to remove the coloring matter or adsorbed impurities by means of special solvents.

Many solvents have been used both singly, in succession, or mixed together. The solvents are generally highly volatile, such as carbon tetrachloride, acetone, benzol, gasoline, alcohol and the like. In some cases acids have been added to the solvents but these acids (hydrochloric and acetic) are also quite volatile. The resulting mixtures have low boiling point ranges according to their components and are usually immiscible with water. Due to the volatility of the solvents, considerable losses by evaporation are incurred during the various steps of washing the filtering material and separating the solvents from their extracted impurities. Furthermore, the low boiling points impose a limitation on the temperature at which impurities may be extracted from the clarifying and decolorizing agents and this retards the speed of revivification.

When these solvents are immiscible with water, it is impossible to wash out the last traces of solvent from the adsorbents, and the low boiling point range of the solvents or their mixtures offer difficulties in the final recovery of these solvents by distillation.

It has been discovered that the many disadvantages heretofore encountered in the revivification of clarifying and decolorizing materials having adsorptive powers may be materially reduced if not eliminated by the use of solvents which have a high selectivity of adsorption or solution for entrained impurities. These solvents are of relatively high boiling point as compared with solvents previously used and are preferably miscible with water. Solvents having these characteristics are most effective for revivifying spent adsorbents, conserving the solvent and recovering by-products.

It has been found that certain diatomic or dihydric alcohols and their derivatives, and particularly ethers, are capable of revivifying spent adsorbents very effectively. For example, solvents of the glycol group such as ethylene-glycol, ethylene-glycol diacetate, ethylene-glycol-mono-ethyl-ether, and the like are of high boiling point, miscible with water and particularly adapted for revivifying spent adsorbents. These solvents are capable of dissolving not only entrained hydrocarbon oils but also are capable of dissolving and effectively removing adsorbed impurities and coloring matter. Ethylene-glycol-mono-ethyl-ether, for example, readily dissolves coloring matter and impurities from the pores of adsorbents spent in the treatment of hydrocarbon oils, has a boiling point of about 137.5° C., has a comparatively low vapor pressure, and is miscible with water. Solvents of this class may be used alone, and due to their high boiling points are effective over a wide range of temperatures, or they may be mixed with acid, water or other solvents such as gasoline, alcohol or benzol. It is impossible to specifically mention all of the organic solvents embraced by this invention but preferably these solvents should be capable of dissolving or exerting a solvent action upon both adsorbed or entrained oil and on adsorbed impurities and coloring matter. The solvents should moreover preferably have a boiling point above 100° C. and be miscible with water so as to enable the solvent to be completely removed from the adsorbent or filtering and decoloring agents by water washing and readily separate the solvent from a water solution or mixture thereof by simple distillation. The choice of solvents may vary somewhat with the character of hydrocarbon oil treated by the filtering or decolorizing agents which it is desired to revivify for reuse and the solvent should preferably be of such character as to be readily separated from the hydrocarbon oil and impurities removed from the decolorizing agent by such solvent. As has been said before, a diatomic alcohol such as glycol having a boiling point of about 196° C. is very effective although other alcohols may be used. For example, derivatives of propane such as CH$_3$.CHOH.CH$_2$OH and
CH$_2$OH.CH$_2$.CH$_2$OH are known to have similar properties to glycol. Generally ethers of diatomic or dihydric alcohols are effective although some of these ethers are not as suitable as others because of their low boiling points. Glyceryl ether may be used as it is soluble in water and has a boiling point of about 170° C. Propargyl alcohol may also be used. Ethylene-glycol-mono-ethyl-ether mentioned heretofore is a very desirable type of solvent but glycol-dimethyl ether is not so suitable as its boiling point is only about 83° C. Any solvent having the above described general characteristics, however, may be employed in the process described and claimed herein.

The operation of my invention may be fully understood by the following description of one particular method of carrying it out. In revivfying clay used in the decolorization of petroleum oils, for example, a quantity of suitable solvent, for instance ethylene-glycol-mono-ethyl-ether, is pumped into a tank suitably equipped with heating coils and agitating means. The spent clay, containing entrained oil and impurities from a decolorizing and clarifying treatment of petroleum oil, may then be introduced into the tank and agitated with the solvent while the temperature of the mixture is raised and maintained at approximately 100° C. The mixture may then be allowed to settle and the solvent, together with its dissolved oil and impurities, removed by decantation. Fresh solvent may then be added to the clay and the operation repeated until the solvent is removed in a clear condition indicating that the extraction is complete. Water may then be introduced into the tank and agitated with the clay at a temperature below 100° C. so as to wash out the remaining solvent and after drawing off, successive water washes may be applied, depending upon the degree of solvent removal and recovery desired.

The clay being freed of its oil impurities and solvent may be kept in aqueous mixture for use in a mudded clay treatment of oil or it may be reduced to any degree of dehydration desired. The water washing may be avoided entirely by heating the clay with its remaining solvent to a temperature above the boiling point of the solvent, for example above about 137.5° C., but in any event the process results in a revivified clay suitable for further use in clarifying and decolorizing oils. With certain types of clay, however, the solvent free clay may be acid treated or activated in any suitable manner so as to increase its adsorptive capacity.

The solvent, together with its dissolved oil and impurities from the clay and the wash water used for the removal of the solvent, may be conveyed to a suitable still or stills in which, by simple fractionation, the oil with its impurities, the water and the solvent are separated. The solvent is thus available for further use without loss or deterioration and the extracted oil and impurities may also be utilized in any desired manner. It is apparent, therefore, that the use of a single efficient solvent of high boiling point not only materially simplifies and improves the revivification process but also facilitates the recovery of the solvent and extracted material. It may be stated here that the particular class of solvents described does not readily react with acids or alkalies, and for this reason the efficiency of the solvent is not impaired by the presence of acids in the oil being removed from the filtering or decolorizing agent.

The process is not only applicable to the treatment of filtering and decolorizing agents used in the treatment of petroleum oils but also for the revivification of materials used in the treatment of any hydrocarbon oil. While the use of certain specific solvents has been described in detail and one particular method of applying a particular solvent described, the invention is not limited thereto but embraces all modifications which come within the scope of the following claims.

I claim:

1. The process of revivifying spent filtering and decolorizing agents containing hydrocarbon oil and impurities comprising, treating said agents with a polyhydric alcohol capable of extracting hydrocarbon oil, and impurities therefrom, said alcohol having a boiling point above 100° C. and being miscible with water.

2. The process of revivifying filtering and decolorizing agents containing hydrocarbon oil and impurities comprising, treating said agents with a glycol derivative capable of exerting a solvent action upon the impurities.

3. The process of revivifying filtering and decolorizing agents containing hydrocarbon oil and impurities comprising, treating said agents with ethylene-glycol-mono-ethyl-ether.

4. The process of revivifying adsorbents containing petroleum oil and impurities comprising, bringing said adsorbents in contact with a glycol derivative capable of adsorbing petroleum oil and impurities present in said adsorbent, removing the solvent with extracted oil and impurities from the adsorbent, and then removing the solvent from the adsorbent by means of water.

5. The process of revivifying adsorbents containing petroleum oil and impurities comprising, bringing said adsorbent in contact with an ether of the glycol group, removing the solvent with extracted oil and coloring matter from the adsorbent, and then adding water to the adsorbent to remove the entrained solvent.

6. The process of revivifying spent adsorbents used in decolorizing and clarifying hydrocarbon oils comprising, agitating the adsorbent with an organic solvent having a boiling point above 100° C. and being miscible with water, heating the mixture to a temperature below the boiling point of the solvent, removing the solvent with extracted oil and coloring matter, adding water to the adsorbent to remove the entrained solvent, and heating the adsorbent to remove remaining water.

7. The process of revivifying spent adsorbents used in decolorizing and clarifying hydrocarbon oils comprising, agitating the adsorbent with a dihydric alcohol miscible in water and having a solvent action on oil and impurities contained in said adsorbents at a temperature below the boiling point of the solvent, removing a portion of the solvent with extracted oil and coloring matter, and removing the entrained solvent from the adsorbent with water.

8. The process of revivifying spent adsorbents used in decolorizing and clarifying hydrocarbon oils comprising, agitating the adsorbent with an organic solvent having a boiling point above 100° C. and being miscible with water, heating the mixture to approximately 100° C. but below the boiling point of the solvent, separating the solvent from the adsorbent, washing the adsorbent with water to remove entrained solvent, and then separating the solvent from the wash water by distillation.

9. The process of revivifying spent adsorbents used in decolorizing and clarifying hydrocarbon oils comprising, agitating the adsorbent with a glycol derivative, adapted to exert a high solubility for hydrocarbon oils and impurities present in such spent absorbent, heating the mixture to below the boiling point of the solvent, then separating the solvent together with extracted impurities from the adsorbent, and removing remaining solvent from the adsorbent with water.

10. The process of revivifying spent adsorbents used in decolorizing and clarifying hydrocarbon oils comprising, agitating the adsorbent with a glycol derivative adapted to exert a solvent action upon hydrocarbon oils present in such adsorbent and having a boiling point above 100° C. and being miscible with water, separating the solvent from the adsorbent, and then removing remaining solvent from the adsorbent with water.

11. The process of revivifying, filtering and decolorizing spent adsorbents containing hydrocarbon oils and impurities, comprising treating said agents with an ether of the glycol group capable of exerting a solvent action upon oil and impurities contained in said agents.

12. The process of revivifying, filtering and decolorizing agents containing hydrocarbon oils and impurities, comprising treating said agents with a glycol derivative having a highly solvent action upon oil and impurities contained in said agents, said glycol derivative having a boiling point above 100° C. and being miscible with water.

Signed at Richmond, California, this 28th day of February, 1928.

FRANKLIN A. BENT.